United States Patent
Xu et al.

(10) Patent No.: US 6,948,884 B2
(45) Date of Patent: Sep. 27, 2005

(54) VORTEX-INDUCED VIBRATION REDUCTION DEVICE FOR FLUID IMMERSED CYLINDERS

(75) Inventors: Qi Xu, Katy, TX (US); Tao Qi, Katy, TX (US); Jeffery C. Measamer, Houston, TX (US)

(73) Assignee: Technip France, Courbevoie (FR)

(*) Notice: Subject to any disclaimer, the term of this patent is extended or adjusted under 35 U.S.C. 154(b) by 0 days.

(21) Appl. No.: 09/808,299

(22) Filed: Mar. 14, 2001

(65) Prior Publication Data

US 2002/0168232 A1 Nov. 14, 2002

(51) Int. Cl.[7] ............................. F15D 1/10; F16L 57/00; E21B 17/01

(52) U.S. Cl. ....................................... 405/216; 405/211

(58) Field of Search .............................. 405/211, 211.1, 405/212–216; 166/350, 367; 114/243

(56) References Cited

U.S. PATENT DOCUMENTS

| | | | |
|---|---|---|---|
| 5,279,368 A | | 1/1994 | Arnott |
| 5,330,294 A | | 7/1994 | Guesnon |
| 5,421,413 A | | 6/1995 | Allen et al. |
| 5,967,699 A | * | 10/1999 | Knapp ........................ 405/211 |
| 5,985,385 A | * | 11/1999 | Gottfried ................ 405/216 X |
| 6,019,549 A | | 2/2000 | Blair et al. |
| 6,042,303 A | | 3/2000 | Head |
| 6,702,026 B2 | * | 3/2004 | Allen et al. .................. 166/367 |

FOREIGN PATENT DOCUMENTS

| | | | |
|---|---|---|---|
| FR | 2367148 | * | 6/1978 |
| GB | 2335248 | * | 9/1999 |
| WO | 0188358 | * | 7/1986 |
| WO | 98/19018 | * | 5/1998 |
| WO | WO 01/77563 A1 | | 10/2001 |

OTHER PUBLICATIONS

Marketing Publication—Aker Maritime; 1996; "Presenting Aker Maritime"; 31 page pamphlet.
Marketing Publication—Doris Engineering; 1998; "35 Years Worldwide Experience"; Certified–ISO 9001.
Marketing Publication—J. Ray McDermott, S.A.; 1999; "Leader in Project Solutions"; 12 page pamphlet.
Predicting Downstream Production Riser VIV by Vibration of Upstream Riser; Modeling Vibration in Presence of High Reynolds Numbers, Offshore, 2001, vol. 61, Issue 3, pp. 60, 117.
Evangelinos, C.; Lucor, D.; Karniadakis, G.E.; DNSDerived Force Distribution on Flexible Cylinder Subject to Vortex-Induced Vibration; Journal of Fluids and Structures (2000), vol. 14, pp. 429–440.
New VIV System Provides Solution, PetroMin (Aug. 1999), vol. 25, Issue 6, p. 60.

(Continued)

*Primary Examiner*—Sunil Singh
(74) *Attorney, Agent, or Firm*—Klein, O'Neill & Singh, LLP; Howard J. Klein

(57) ABSTRACT

A mechanism to be applied to an exterior surface of a cylindrical structure for the reduction of the effect of Vortex Induced Vibration (VIV) in the cylindrical structure when immersed in flowing fluid, wherein the mechanism includes a generally cylindrical column having a central axis, an interior surface corresponding in size and shape to the exterior surface of the cylindrical structure to which the mechanism is to be applied and an outer surface defining a wall thickness. A reduced wall thickness is formed into the outer surface in a pattern to produce a discontinuity that interrupts the lengthwise coherence of vortex shedding of moving fluid from the outer surface when the cylindrical column is attached to the exterior of the cylindrical structure in the flowing fluid. The effect of VIV on the cylindrical structure is effectively reduced. The result is a submergible cylindrical assembly for positioning in a flowing body of water and having enhanced resistance to VIV.

5 Claims, 11 Drawing Sheets

OTHER PUBLICATIONS

Earl, C.P.; Parkinson, N.; Zhao, W.; Wind Vortex–Induced Vibration of Structural Members ina Steel Tower: A Case History; Water, Maritime and Engery(1998), vol. 130, Issue 4, pp. 238–239.

Gotthardt, B.; Vortex Metering, Measurements & Control (Jun. 1998), vol. 32, Issue 3, pp. 97–100.

Blevins, R.D.; Tilden, B.W; Martens, D.H.; Vortex–Induced Vibration and Damping of Thermowells; Journal; of Fluids and Structures (1998), vol. 12, pp. 427–444.

Hover, F.S.; Miller, S.N.; Triantafyllou, M.S.; Vortex–Induced Vibration of Marine Cables: Experiments Using Force Feedback; Journal of Fluids and Structures (1997), vol. 11, pp. 307–326.

Earl, C.P.; Parkinson, N. Zhao, W.; Wind Vortex–Induce Vibration of Structural Members in a Steel Tower: A Case History; Water, Maritime and Engery (1997), vol. 124, pp. 32–43.

Verezub, N.A.; Zharikov, E.V.; Myal'dun, A.Z.; Prostomolotov, A.I.; The Phenomenon of Large–Scale Vortex Formation Induced on the Surface of a Liquid by the Vibration of a Solid Body, Physics–Doklady, vol. 41, No. 10, 1996, pp. 471–474; translated from Doklady Akademii Nauk, vol. 350, No. 4, 1996, pp. 474–477.

Cai, Y.; Chen, S.S.; Dynamic Response of a Stack/Cable System Subjected to Vortex Induced Vibration, Journal of Sound and Vibration (1996), vol. 196, Issue 3, pp. 337–349.

Blackburn, H.; Henderson, R.; Lock–In Behavior in Simulated Vortex–Induced Vibration; Experimental Thermal and fluid Science (1996), vol. 12, pp. 184–189.

Chen, S.S., Zhu, S.; Cai, Y.; An Unsteady Flow Theory for Vortex–Induced Vibration; Journal of Sound and Vibration (1995), vol. 184, Issue 1, pp. 73–92.

Kawai, H.; Effects of Angle of Attack on Vortex Induced Vibration and Galloping of Tall Buildings in Smooth and Turbulent Boundary Layer Flows; Journal of Wind Engineering and Industrial Aerodynamics (1995), vol. 54/55, pp. 125–132.

Goswami, I.; Scanlan, R.H.; Jones, N.P.; Vortex–Induced Vibration of Circular Cylinders. II. New Model; Journal of Engineering Mechanics (1995), vol. 121, Issue 2, pp. 350–353.

Corless, R.M.; Parkinson, G.V.; Mathematical Modelling of the Combined Effects of Vortex–Induced Vibration and Galloping. Part II.; Journal of Fluids and Structures (1993), vol. 7, pp. 825–848.

Goswami, I.; Scanlan, R.H.; Jones, N.P.; Vortex–Induced Vibration of Circular Cylinders. I: Experimental Data; Journal of Engineering Mechanics (1993), vol. 119, pp. 2270–2287.

Goswami, I.; Scanlan, R.H.; Jones, N.P.; Vortex–Induced Vibration of Circular Cylinders. II: New Model; Journal of Engineering Mechanics (1993), vol. 119, pp. 2288–2302.

Vandiver, J.K.; Dimensionless Parameters Important to the Prediction of Vortex–Induced Vibration of Long, Flexible Cylinders in Ocean Currents; Journal of Fluids and Structures (1993), vol. 7, pp. 423–455.

* cited by examiner

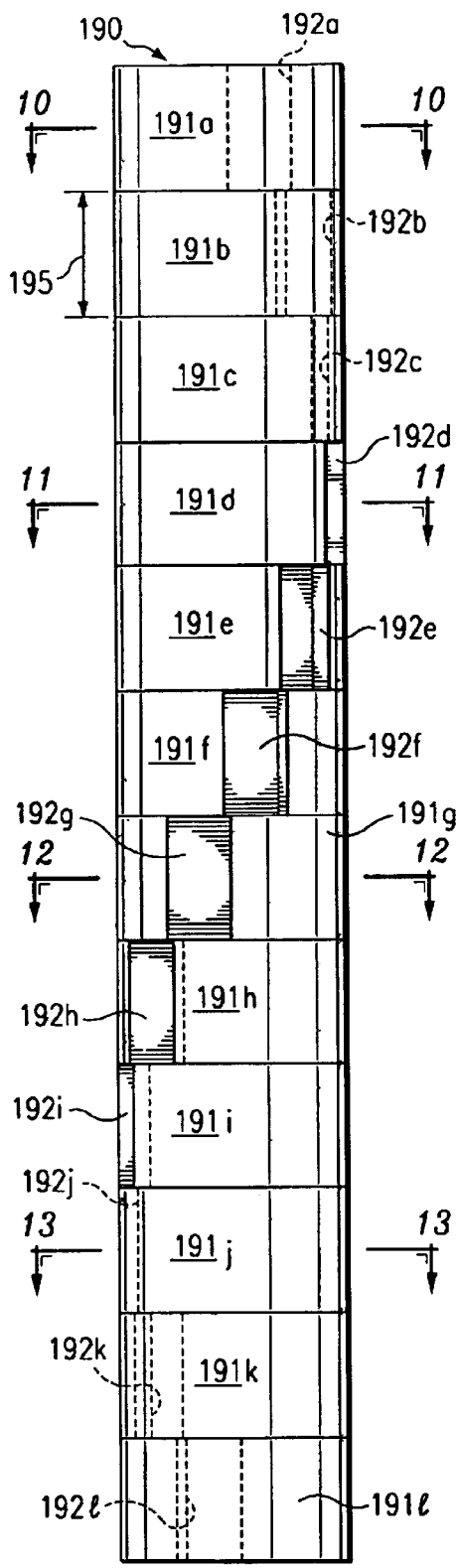
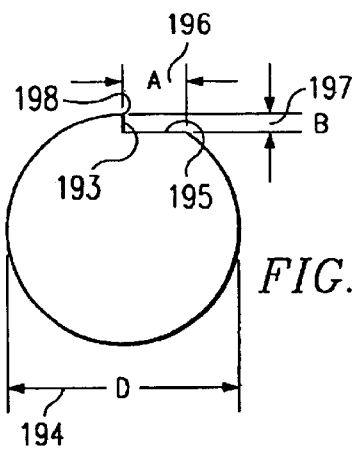
FIG. 10
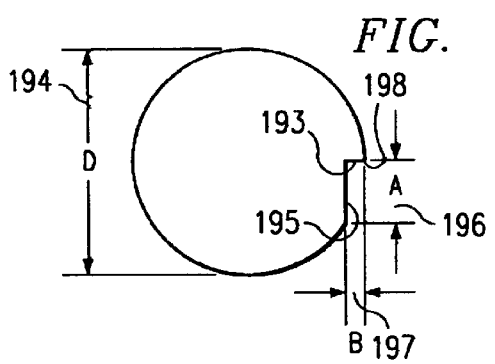
FIG. 11
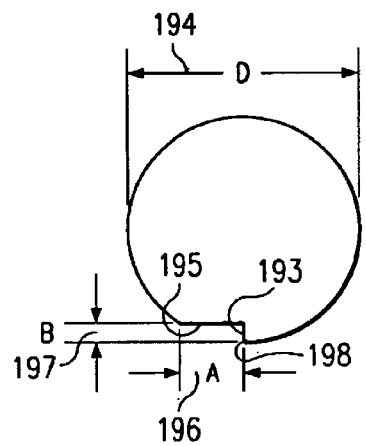
FIG. 12
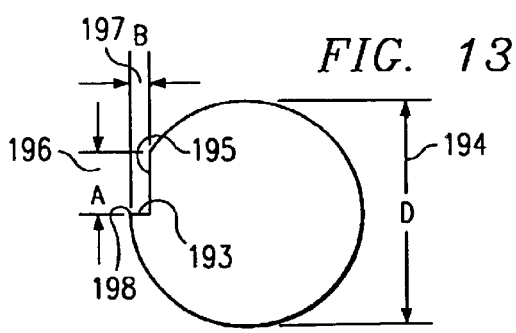
FIG. 13
FIG. 9

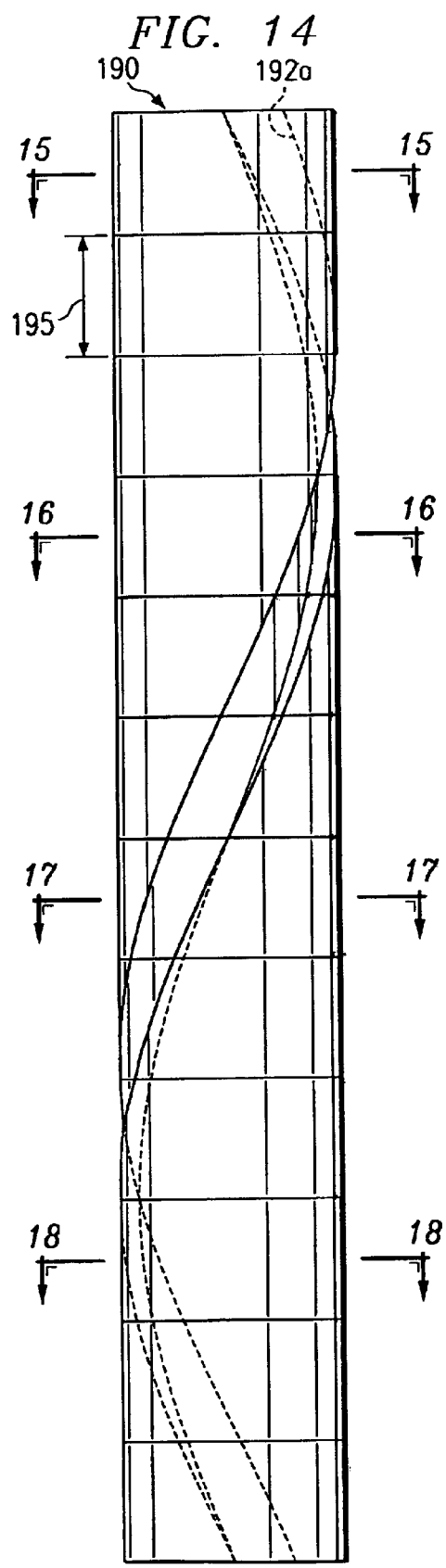
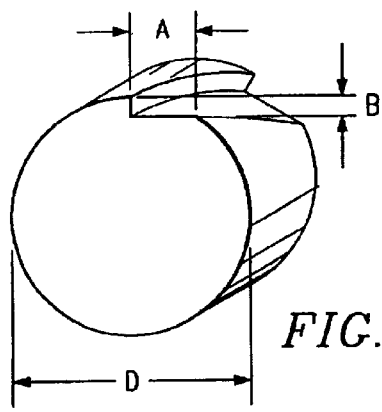
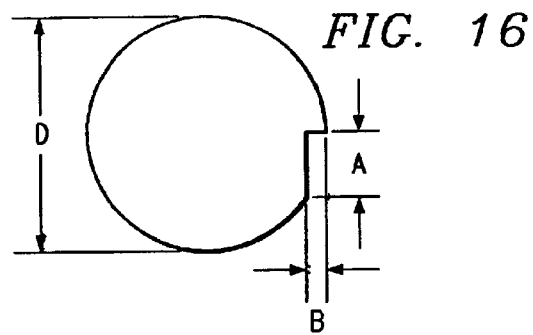
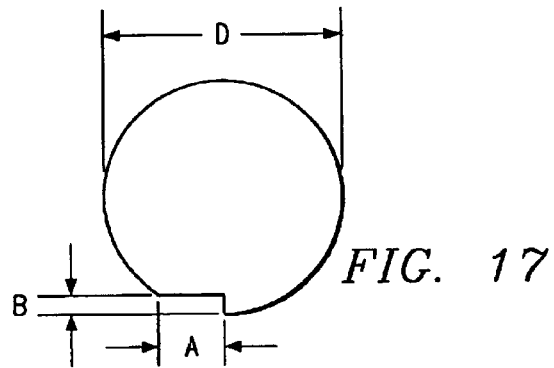
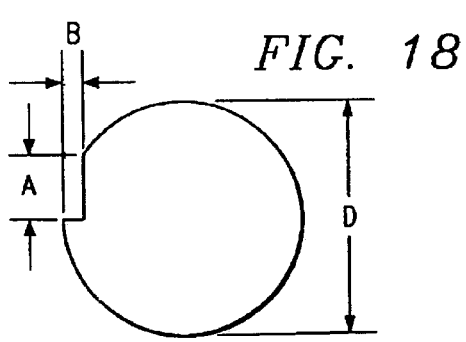

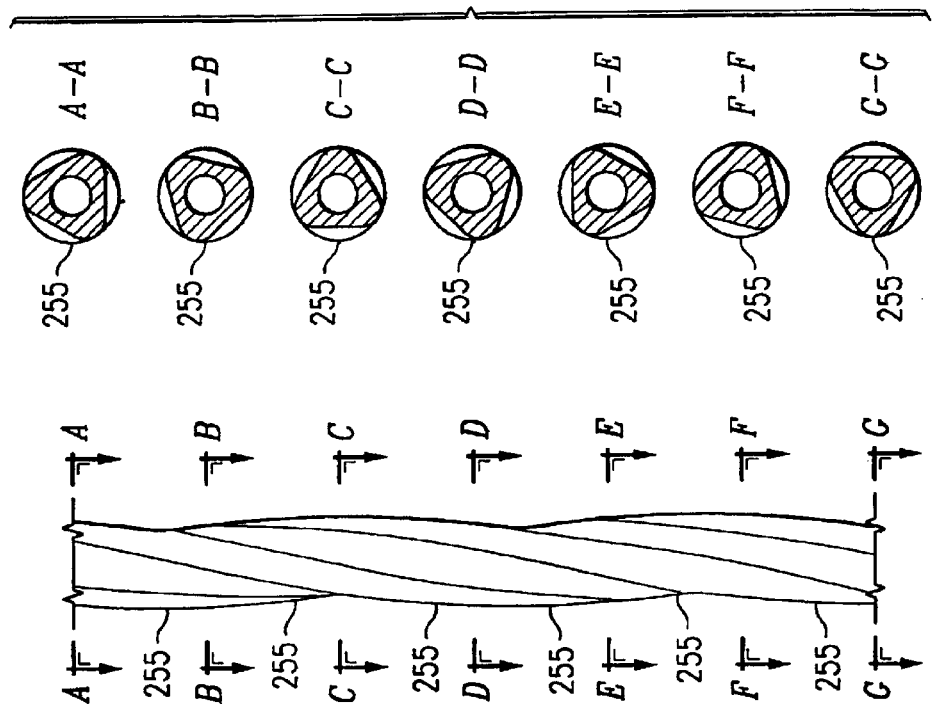
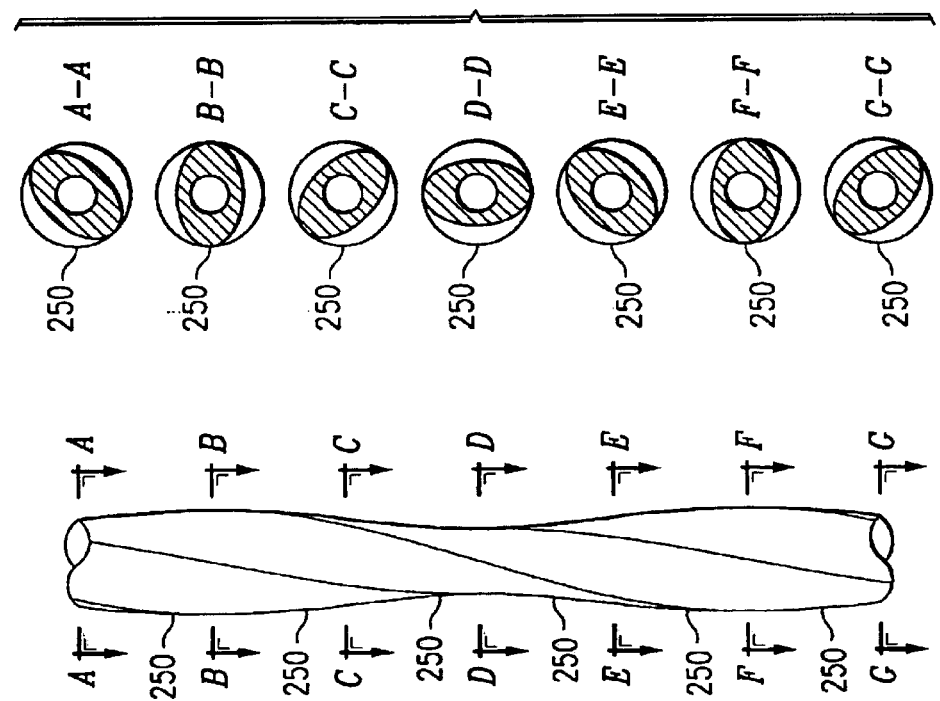

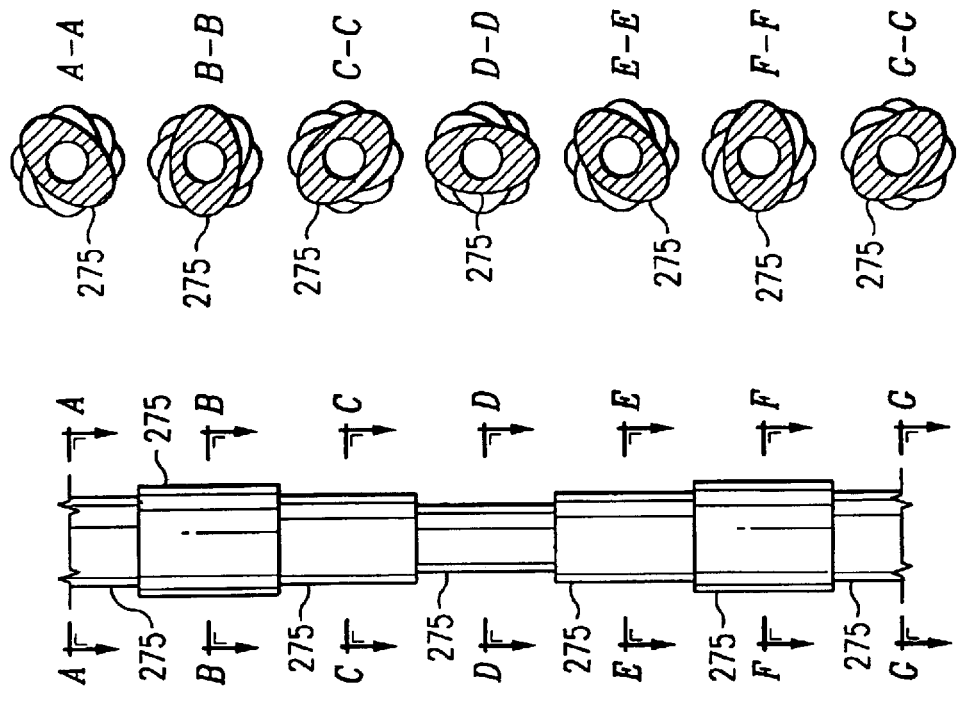
FIG. 30
FIG. 31
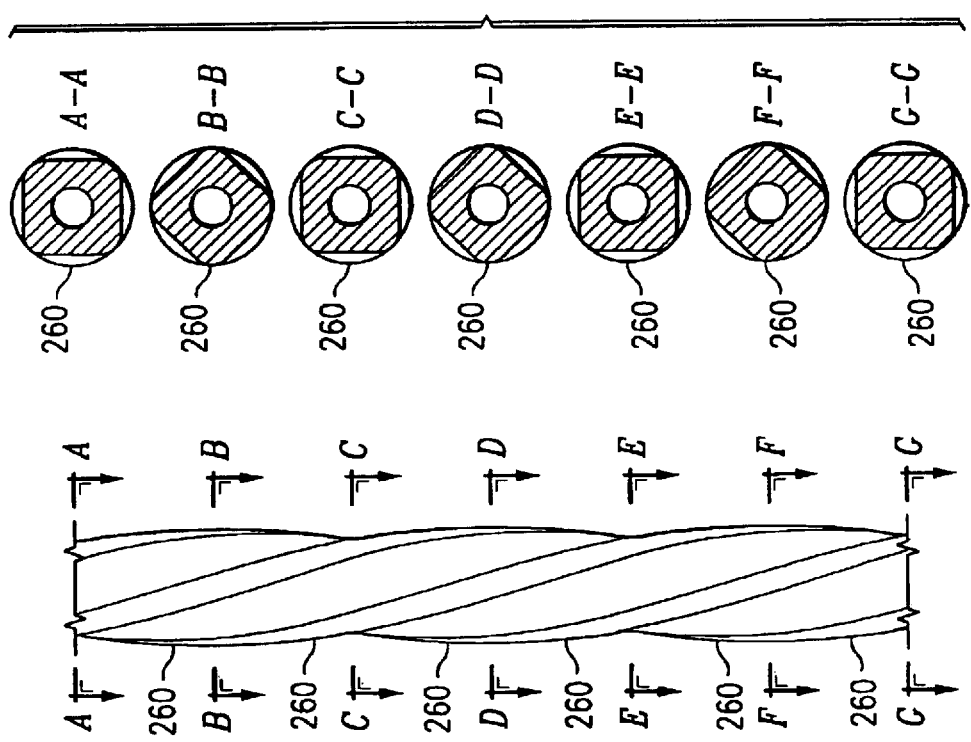
FIG. 28
FIG. 29

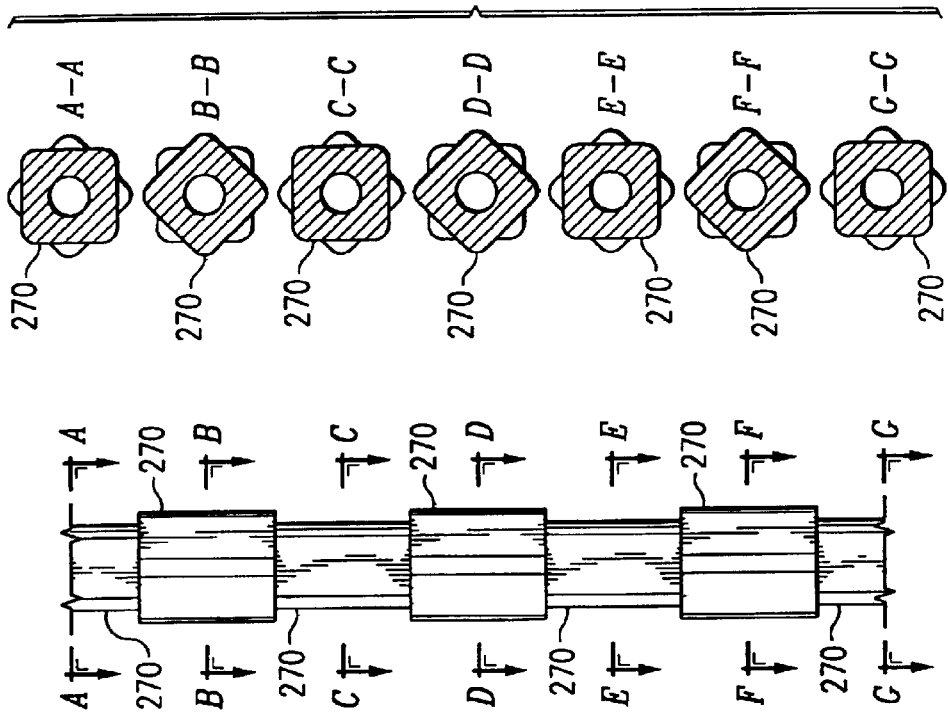
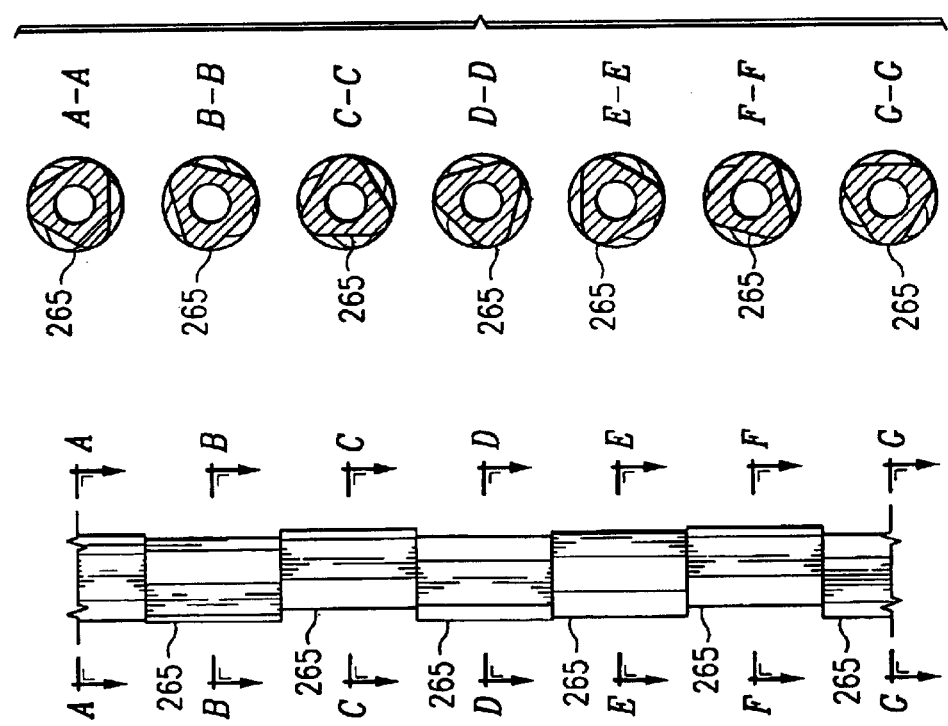

VORTEX-INDUCED VIBRATION REDUCTION DEVICE FOR FLUID IMMERSED CYLINDERS

TECHNICAL FIELD OF THE INVENTION

This invention relates in general to the field of solid and hollow cylinders, such as risers, hoses, pilings and pipes immersed in a fluid subject to relative motion between the cylinder and the fluid. In particular, the invention relates to a device and mechanism and method for reducing vortex-induced vibration caused by relative movement of water past a cylinder and also to a cylindrical assembly incorporating the inventive mechanism.

BACKGROUND OF THE INVENTION

Without limiting the scope of the invention, its background will be described primarily with reference to offshore risers used in sub-sea production wells as an example. Submerged cylindrically-shaped objects, such as risers, spars, or other elongated cylindrical structures used for under-sea oil or gas production, pumping, or loading are often exposed to relative movement of a body of fluid, particularly moving sea currents. Such elongated cylindrical structures are common in offshore petroleum exploration, production and transportation. Sometimes such elongated cylindrical structures extend from the surface to hundreds of meters below the surface, as in the case of spar platforms for production. Sometimes the cylindrical structures extend from the seabed thousands of meters upward toward the surface and into sea currents, as in offshore production risers, loading and unloading risers or hybrid risers for petrochemical production or transport. Cylindrical riser structures may support on their exterior or encase one or more pipelines or risers extending from the seabed to a drilling or production platform, to a ship or to another offshore structure or vehicle. Such risers or cylindrical riser support structures are continuously exposed to ocean currents that produce vortexes or vortices that tend to travel downstream with the current as the water moves around and past the risers. These vortices produce oscillating "lift" forces on the cylindrical structure as a result of vortex shedding and the spanwise, or lengthwise, coherence of the vortex shedding can produce substantial cumulative lift force on the elongated cylindrical structure. The effect is particularly adverse in the case of a cylindrical riser support column extending several hundreds of meters in the path of the current.

The lift forces due to vortex shedding act generally normal to the axis of the cylindrical structure and flow direction. As a vortex is produced and then separated in a "sheet" from the cylindrical surface along the length or span of the cylinder exposed to the current, the lift force can be significant and destructive. The vortices are swirling currents that repeatedly shed from the cylinder, sometimes called "Von Karman Vortex Sheets" and produce vortex-induced vibration. The vibratory movement or vortex-induced vibration (VIV) Von Karman Vortex caused by the repeated sheet separation from the cylinder is sometimes called "Aeolian Vibration." This vortex-induced vibration creates cyclic stresses on the cylindrical structure that may be too small to cause immediate fracture, but upon constant repetition may weaken or damage the riser through material fatigue or stress-induced fracture. In certain relatively common current situations, a resonant vibration can be created, causing repetitive forces in phase with the vibratory motion that can overstress the cylindrical structure to potentially catastrophic failure.

In the past, fins protruding from the peripheral surface of the cylinders exposed to the current or other fluid movement, as in production riser situations, were used to reduce the adverse effect of such vortex formation and vortex sheet shedding. For example, helically-arranged vortex-shedding ribs, or strakes, have been designed to be installed on submerged risers exposed to ocean currents. In one prior device, such strakes are to be incorporated as components of a flexible wrap or panel to be disposed about and secured to the submerged riser. Typically the strakes are to be clamped to the riser prior to its being submerged. Such strakes could be formed by pairs of clamping flanges mounted along the adjacent edges of elongated parallelogram-shaped wrap segments. The wrap segments could be positioned side-by-side, twisting around the outer surface of the riser, and then bolted to engage at the clamp flanges, forming a helical strake extending in a spiral around and along the length of the cylindrical structure that will be exposed to moving current.

In another design, one or more ribs or strakes could be attached vertically or diagonally on a flat, rectangular panel of flexible wrapping material. The wrapping material would be dimensioned to encircle, by itself, an elongated segment of a single riser, piling, pipe or other cylindrical object. Clamping flanges were to be mounted along opposed vertical edges of the rectangular panel. The clamping flanges were to be brought together and clamped, thereby stretching the panel to wrap securely around and frictionally embrace the outer surface of the riser. A plurality of such wrapped panels with ribs or strakes were to be clamped in deployed positions, along the length of the cylindrical structure such that the strakes were aligned at either end of adjacent panels in a helical configuration encircling the wrapped riser structure.

It is difficult to transport, handle and install a cylindrical riser support structure having protruding strakes. Further, it has been found that installation underwater at the riser site is extremely difficult and usually impractical. It has been found that fabrication of a cylindrical riser structure with a protruding strake of a prior design is costly. Additionally, it has been found that the protruding strake on a cylindrical riser support structure increases the viscous drag of the water against the riser assembly, thereby risking greater stress and requiring increased size and strength for the riser support design.

In certain riser installations, a polymeric coating and, in particular, a polymeric foam layer is applied to the exterior surface of the risers and the riser support cylinder to provide protection from the undersea environment and advantageously to provide buoyancy to the assembly. The riser itself may be composed of a metal or a composite material. The riser support structure is normally a metal support cylinder with the metal or composite cylindrical riser pipe lines and polymeric foam coating material attached to the surface of the metal cylinder to facilitate maintaining the riser and support structure in an upright position by reducing the combined mass density (i.e., by adding buoyancy). It has been found that securing strakes, of any prior known design, to the exterior of a layer of polymeric foam is difficult. For example, clamping of strakes to the polymeric surface often fails due to insufficient compression strength of the foam. Particularly, in the case of a polymeric foam coating or bundle on the riser or riser support cylinder, clamping tension may not be sufficient to maintain the strakes in a secure position. Excessive clamping tension can significantly reduce the buoyancy by crushing the foam layer.

A need has therefore arisen for a device, mechanism and method to reduce, resist or suppress vortex induced vibration (VIV), or the effect of VIV on submergible cylinders such as risers and riser support columns, without requiring the attachment of a protruding strake. A need has also arisen for a submergible riser assembly with a VIV reduction mechanism attached that is easy to transport, easy to handle and easy to install and that is not costly to fabricate. In addition, a need has arisen for such a VIV reduction mechanism for fluid immerse cylindrical structures and assemblies, including submergible riser assemblies that does not significantly increase the viscous drag of moving fluid or moving water against the immersed cylinder or submerged riser assembly.

SUMMARY OF THE INVENTION

The present invention disclosed herein comprises a device, mechanism and method for use in a generally cylindrical assembly that is resistant to vortex-induced vibration when immersed in a moving fluid. The generally cylindrical assembly of the present invention, and particularly in the case of a cylindrical riser assembly, is easy to transport, handle and install and is not costly to fabricate. In addition, a feature of one embodiment of a cylindrical assembly according to certain inventive aspects of the present invention is that the cylindrical assembly is submergible in a body of water and resists or reduces vortex-induced vibration (VIV) and does not significantly increase the viscous drag of the fluid or water moving past the cylindrical assembly.

The vortex induced vibration (VIV) reduction mechanism of the present invention and the submergible cylindrical assembly of the present invention having such VIV reduction mechanism combined therewith effectively reduce the adverse effect of vortex-induced vibration when positioned in a flowing body of fluid such as water. The VIV reduction mechanism comprises a generally cylindrical column having a central axis, an outer surface, a wall thickness and a length. A pattern is cut or formed into the outer surface of the generally cylindrical column to selectively decrease the distance of the outer surface from the central axis. The pattern may be formed with a plurality of columnar sections each having a notch cut into the outer surface. A plurality of columnar sections are placed in series or stacked along the length of the cylindrical column. The notch of each columnar section is positioned in a selected circumferential angular relationship with the notch of each other columnar section and extends partially along the length of the column, thereby selectively reducing the thickness of the wall and producing a discontinuity in the outer cylindrical surface at selected positions. The angular position of each notch or of each reduced thickness portion of a wall around the circumference of the generally cylindrical column sections is differently selected along the length of the column. The selected angular positions provide a pattern of discontinuities on the generally cylindrical outer surface of the column. It will be understood that for a solid cylinder the wall thickness is nominally equal to the nominal radius. For a riser support column comprising a hollow cylinder encased in a polymeric or foam material, the wall thickness is less than the nominal radius. Selectively decreasing the distance from the axis to the surface might also be considered the same as reducing the wall thickness at selected locations or in a desired pattern. The reduced radius or reduced wall thickness preferably provides a sharp discontinuity in the surface.

Preferably, the discontinuities will be selectively and appropriately positioned in a pattern, desirably a helical pattern, along the length of the column so that the VIV effect of vortex sheet separation from the cylindrical column is reduced. Forming or approximating a helical shaped discontinuity along the length of the cylindrical structure exposed to moving current facilitates reduction of VIV, or at least reduces its negative effects in the cylindrical structure. The discontinuity acts to shed the vortex at different times at different segments along the length of the cylinder. The various vortex-created lift forces are out of phase from each other and thus are out of phase with the oscillation that the forces would otherwise cause in the cylindrical structure at any given time. The "out of phase" forces tend to cancel each other out. Thus, the vibratory effect of vortex-induced lift forces on the cylinder are reduced.

The abrupt reduction in thickness or the formation of a sharp discontinuity in the outer surface is generally accomplished using variously shaped notches or grooves. Preferably, notches or grooves having sharp corners have been found to be useful, such as a right angle triangular-shaped notch, an equilateral triangular-shaped notch, a rectangular-shaped notch, or other angular polygon. The notches or reduced thickness areas causing discontinuities in the outer surface of the cylindrical structure are either formed in a substantially continuous helical pattern or formed with segments of notches that are rotated to different angular positions at regular intervals along the length of the cylindrical structure. By forming relatively short segments of longitudinal notches and sequentially rotating each notch consistent angular amounts (between 10° and 90°) at regular intervals of length (between about 0.1 and 10 times the diameter), a long helical shape is approximated by the plurality of rotated notches or grooves. A series of partially rotated column sections, each column section having vertical or slightly angled notches or grooves may be provided along the length of the cylindrical column structure. By rotating the column sections at the time they are affixed to the support cylinder, a helically shaped groove is approximated by vertically elongated notches. A better approximation of a helical groove may be formed by a series of columnar sections having angled notch segments aligned end to end by rotating the columnar sections.

A generally cylindrical column structure to which the present inventive VIV reduction mechanism is to be applied according to the disclosure herein, might typically be a support structure for drilling risers or production risers. It will be understood that this is by way of example only of the cylindrical structure to which the VIV reduction device and mechanism is applied. The resulting inventive VIV reduced cylindrical assembly may also be used for other cylindrical structures; i.e., it may be a drilling riser, a production riser, a hybrid riser and/or any number of other elongated cylindrical structures that may be subjected to the adverse effects of VIV. The cylindrical structure may comprise a solid metal outer surface or may comprise a composite material on which a VIV reduction mechanism is secured or formed. The VIV reduction mechanism may be notches or grooves formed in the solid surface. Preferably notches or grooves in helical pattern may be formed into a composite polymeric material or a polymer foam material secured, attached or formed onto the surface of a generally cylindrical support structure such as a riser support cylinder or cut or molded into the surface of a generally cylindrically shaped polymer foam material attached on the outer surface of any immersed cylindrical structure. The VIV reduction mechanism may also be formed in a composite structure with notches, grooves or other discontinuity formed into the outer surface or into the wall thickness, as described herein.

BRIEF DESCRIPTION OF THE DRAWINGS

The foregoing objects, advantages, and features, as well as other objects and advantages, will become apparent with reference to the description, claims and drawings below, in which like numerals represent like elements and in which:

FIG. 9 shows the arrangement of the segments and notches depicted in FIGS. 6–8 in the longitudinal direction. For clarity only one notch on each columnar segment is shown.

FIGS. 10–13 show cross-sections of the segments of FIG. 9 taken along the lines 10—10, 11—11, 12—12, and 13—13, respectively.

FIG. 14 shows another arrangement of the notches depicted in FIGS. 6–8 in the longitudinal direction. In this embodiment, successive notches form a spiral line. For clarity, only one notch on each columnar segment is shown.

FIGS. 15–18 show cross-sections of the segments of FIG. 14 taken along the lines 15—15, 16—16, 17—17 and 18—18, respectively.

FIGS. 24 and 25 show another embodiment where the cross section of the segment is an ellipse and the angular orientation of the long axis of each rotates, as shown in the cross-section in FIG. 25, to form a spiral (twisted) shape.

FIGS. 26 and 27 show another embodiment where the cross section is a triangle with rounded corners. The angular orientation of each triangle rotates, as shown in the cross-section in FIG. 27, to form a spiral (twisted) shape.

FIGS. 28 and 29 show another embodiment where the cross section is a square with rounded corners. The angular orientation of the square rotates, as shown in FIG. 29, to form a spiral (twisted) shape.

FIGS. 30 and 31 show another embodiment where the cross section is an ellipse. The angular orientation of the long axis of the ellipse rotates, as shown in FIG. 31, to form a discontinuous stepped pattern.

FIGS. 32 and 33 show another embodiment where the cross section is a triangle with rounded corners. The angular orientation of the triangle rotates, as shown in FIG. 33, to form a discontinuous stepped pattern.

FIGS. 34 and 35 show another embodiment where the cross section is a square with rounded corners. The angular orientation of the square rotates, as shown in FIG. 35, to form a discontinuous stepped pattern.

DETAILED DESCRIPTION OF THE PREFERRED EMBODIMENTS

While the making and using of various embodiments of the present invention are discussed in detail below, it should be appreciated that the present invention provides many applications for the inventive concepts which can be embodied in a wide variety of specific contexts. The specific embodiments discussed herein are merely illustrative of specific ways to make and use the invention and do not delimit the scope of the invention.

Figure 1:
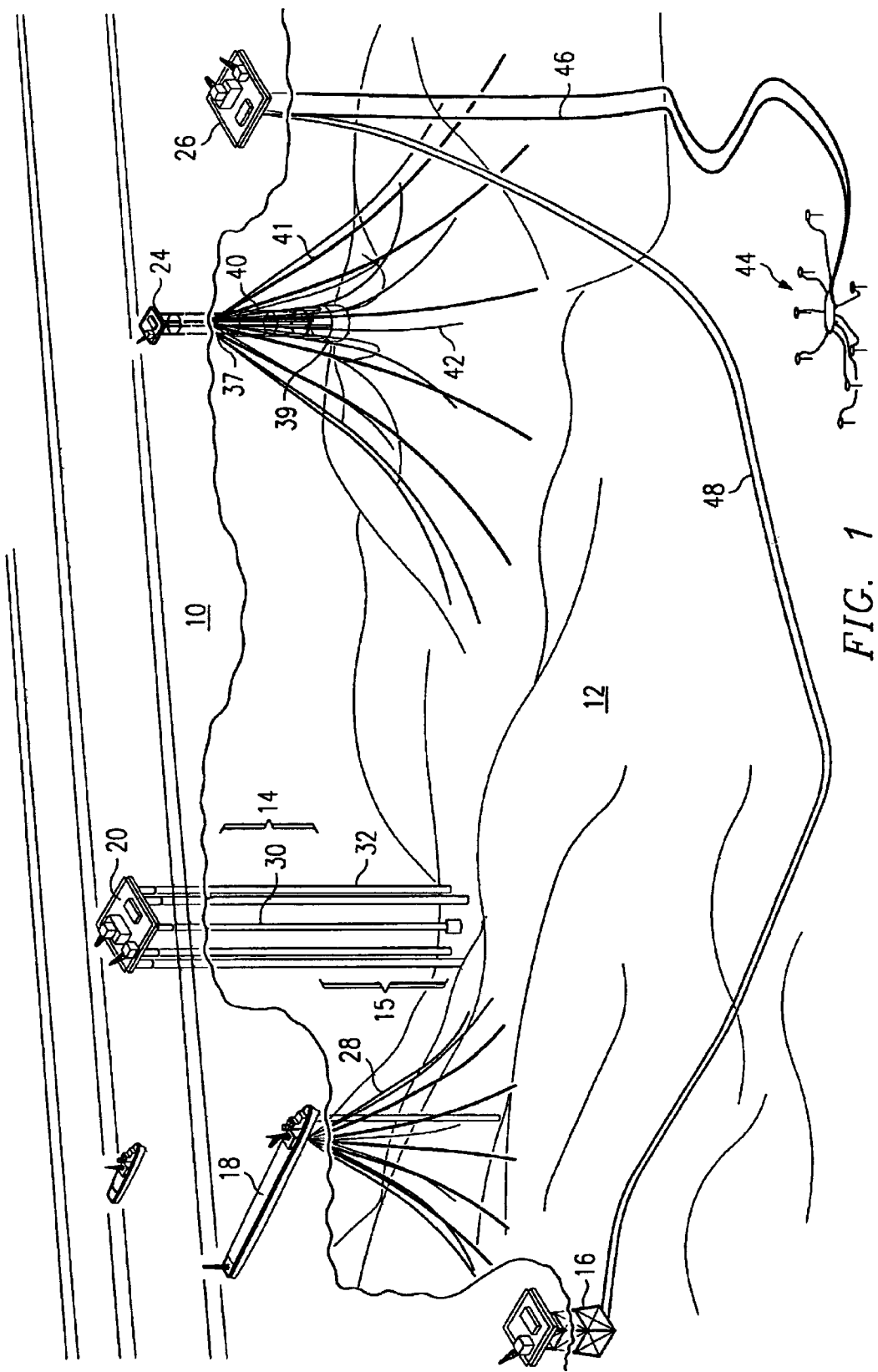
FIG. 1 is a schematic perspective, partially cutaway view, depicting various undersea uses of cylindrical columns in moving fluid (i.e., vertical cylindrical columns in horizontal water currents).

Referring to FIG. 1, which is a schematic depiction of floating production systems on the sea surface 10 and extending from the seabed 12 through a distance of ocean, including a portion 14 having sea currents and a portion 15 without significant sea currents. Examples of various ocean equipment to which the invention may be usefully applied are depicted, including a sea floor drilling rig 16, a ship 18, a columnar-supported drilling platform 20, and a spar platform 24, as well as a collection vessel 26. Risers 28 are shown extending from the seabed 12 to the collection ship 18 where hydrocarbons are pumped on board from the risers and transported to an appropriate port facility where similar risers may offload the petroleum products to a refinery. The drilling or production platform 20 is schematically depicted with a drill casing 30 extending to the floor surface and also support legs 32 on which the drilling or production platform is secured to the sea floor 12.

The spar platform hull 24 is supported on a large cylindrical spar hull 40 having a heavy end 39 and an upwardly buoyant end 37 so that the platform 24 is floating in a desired position and may be anchored in position with mooring lines 41. Top tension risers and steel catenary riser pipes 42 extend upward to the spar platform 24 and through or about the spar hull 40 to the production platform 24. The collection vessel 26 is shown receiving hydrocarbon from a hydrocarbon collection system 44 for sub-sea wells on the seabed 12 and providing the produced hydrocarbons through upwardly extending risers 46 and also collecting hydrocarbons from the well 16 through elongated recovery pipes 48 that may extend flexibly along the seabed 12 and upward to collection vessel 26.

The foregoing floating production systems are depicted by way of background so that uses of the inventive VIV reduction mechanism according to various embodiments of the present invention may be more fully understood as to the wide ranging applications to riser cylinders drill casings, riser support columns, pipes, platform legs, cylindrical spars and other similar immersed cylindrical structures.

Figure 2:
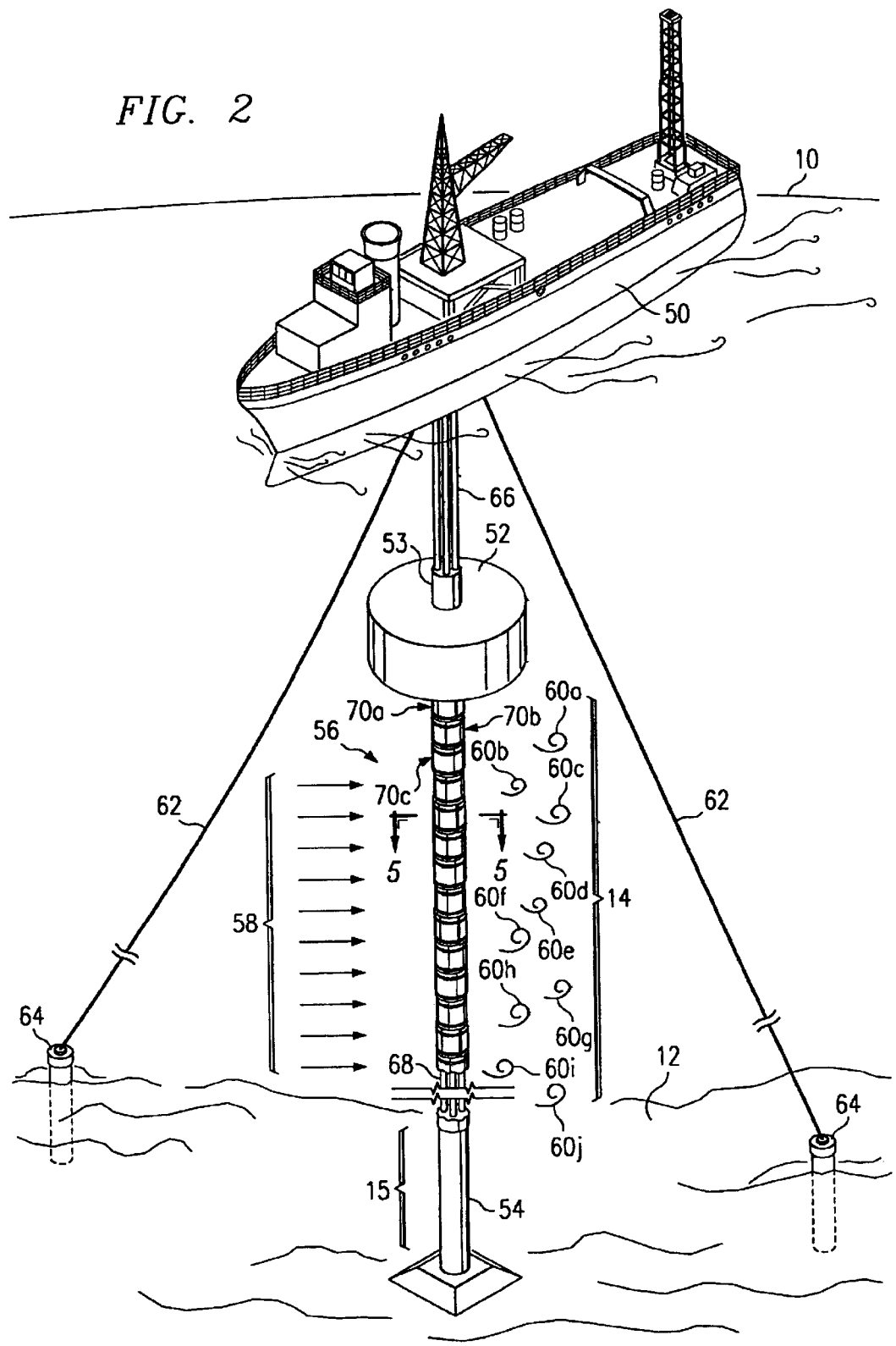
FIG. 2 is a schematic depiction of a cylindrical riser bundle support assembly provided with an upper buoyancy can, and a cylindrical support structure for the bundle of tubular risers with the cylindrical support structure having applicants' VIV suppression invention applied to the cylindrical exterior surface.

With reference to FIG. 2, a production/transport vessel 50, in this case a ship 50, is shown in position for receiving hydrocarbons above a buoyancy canister 52 attached to a riser support cylinder 54 so that the riser support cylinder 54 may be held upright and having a connection in 53 held adjacent to the sea surface 10. Depicted in FIG. 2 is one embodiment of VIV reduction mechanism 56 attached along a length 14 exposed to current 58 that is depicted as horizontal arrows 58. In shallow waters, the current 58 may extend from the sea surface 10 to the seabed 12, however, in deep waters as is often the case, the current 58 may extend a length 14 that may be several hundred to several thousand meters deep. In situations where the sea depth is thousands of meters, there will also be a length 15 of riser 54 that is not exposed to any significant current. In situations where no VIV reduction mechanism 56 is applied to the cylindrical riser support, the current 58 will form vortexes or a sheet of vortex material along substantially the entire length 14 exposed to the current 58. With vortex reduction mechanisms 56 applied to riser support structure 54, the vortices 60a, b, c, d, e, f, and g will each shed from the column surface at different times and/or different locations such that the lifting force at each longitudinal position along the riser support structures is out of phase with the oscillation of the entire riser 54 thereby canceling out the vibration. This effectively reduces the vibration.

The vessel 50 is shown held in place by anchor cables 62 attached to sea anchors 64 so that the conduits 66 from the connection head to the production vessel 50 are retained in a relatively stable position. The VIV reduction mechanism 56 applied along cylindrical riser 54 comprises a plurality of VIV reduction column segments 70. These have been labeled starting at the topmost as VIV reduction column segment 70a with the next columnar segment 70b, 70c etc. Each columnar segment is rotated relative to the next such that a sharp notch, groove, or discontinuity, as described below, provided in each columnar segment, is circumferentially displaced relative to the notch, groove or discontinuity in the adjacent segment.

Advantageously, the discontinuity areas are rotated angularly with each successive columnar segment to a different angular position relative to the adjacent columnar segments. Desirably, for example, segment 70b is rotated an angle of between about 10° and 90° relative to segment 70a. Also desirably segment 70c is also rotated to the same angular amount relative to 70b as 70b is rotated relative to 70a. Thus, a consistent rotational interval is provided along each VIV reduction column segment.

As will be described more fully below, the column segments may have an axial length that is between about ½ times the diameter to about 10 times the diameter. In particular, it has been discovered that columnar segments having a length of approximately 1½ times the diameter each rotated about 30° relative to each other will advantageously break up the vortex sheet. Vortex shedding at one column will be out of phase with the next so that vortex induced lifting forces are out of phase and cancel each other. By rotating each columnar segment, a consistent rotational angle between about 10 and 90°, a helical design is approximated. Each VIV reduction columnar segment may comprise one or a plurality of longitudinal VIV reduction discontinuities. Generally speaking, the greater number of discontinuities per columnar segment, the longer the columnar segment may be and still have a desired VIV reduction effect. Various embodiments, constructions and manufacturing of VIV reduction columns will be discussed more fully below with reference to FIGS. 5–43.

Figure 3:
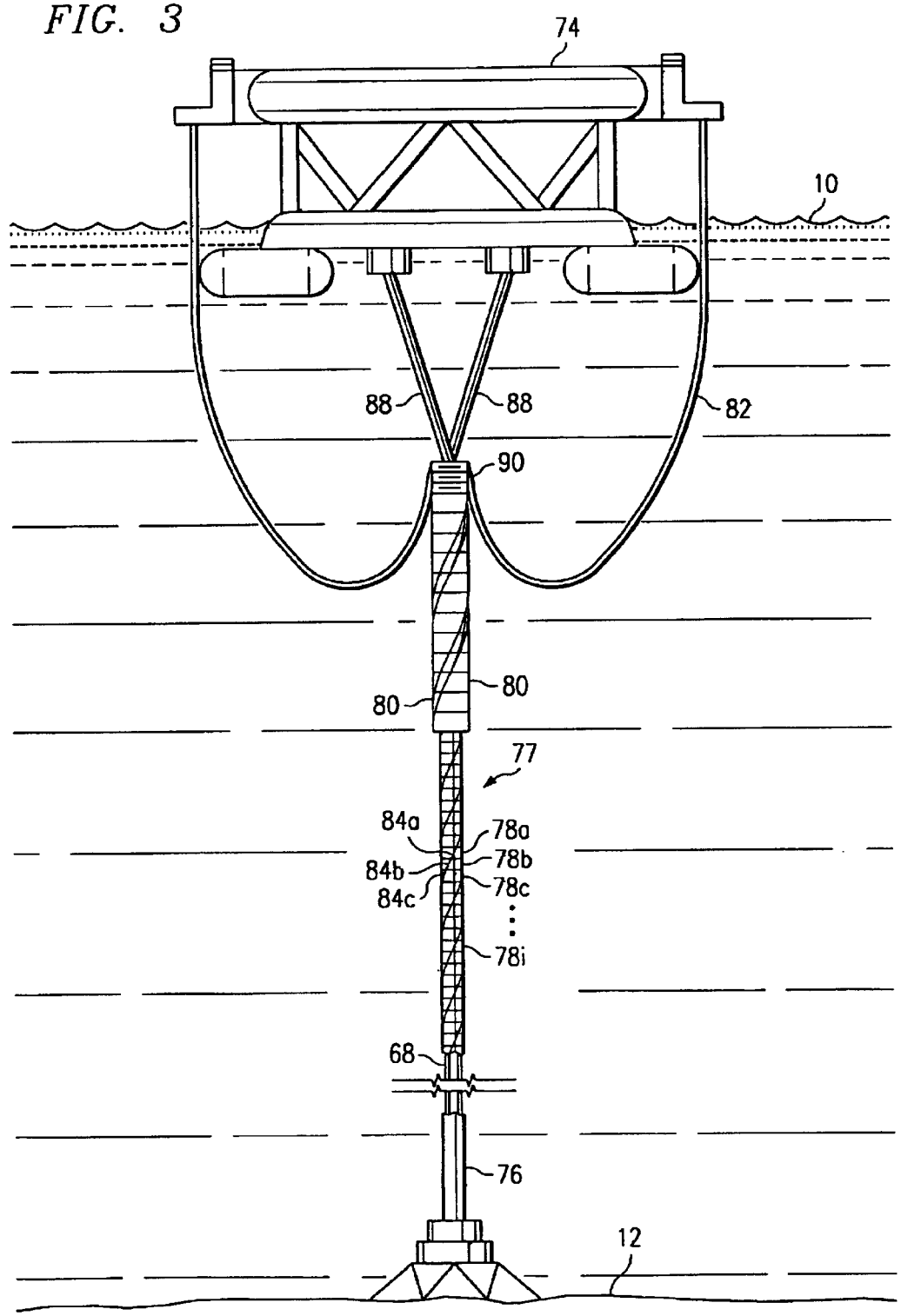
FIG. 3 is a schematic depiction of a hybrid riser assembly having a cylindrical riser support structure with a portion thereof having, for additional buoyancy, substantially cylindrical foam to which applicants' inventive VIV suppression device has been applied.

Turning now to FIG. 3, which is a configuration of hybrid riser, an additional application of the inventive VIV reduction mechanism may be more fully understood in connection with a support riser 76 having structural steel pipe inside the bundle, by which a plurality of riser pipes 68 may be supported vertically upward from the seabed 12 to a position close to sea surface 10, for providing flexible riser 82 connection to floating platform 74. In this embodiment, the VIV reduction mechanism 77 comprises of a plurality of VIV reduction columnar segments, 78a, b, c, and d etc., each having a VIV reduction notch 84a, b, c, and d etc. preferably a plurality of angled notches or discontinuities 84a, b, c, and d etc. The angle of the notch relative to the longitudinal axis of a columnar segment 78, desirably provides a segment of a helical notch 84. Adjacent VIV reduction columnar segments 78a and b are each simultaneously merged and are each rotated relative to each other at appropriate angular interval so that the notches 84a and 84b are lined end to end form a cylindrical notch comprised of a plurality of segments 84b, c, d, e, f, g, and etc. The number of columnar segments required to provide the VIV reduction system along the length of riser support 76 that is exposed to currents will depend upon the depth of the currents and the length of each columnar segment.

In the embodiment shown in FIG. 3, additional buoyancy polymeric foam segments 80a, b, c and etc. are also provided secured to the cylindrical riser support structure 76 toward the top thereof where it may be tethered through cables 88 to a production platform 74 floating on the sea surface 10. A connection head 90 is provided by which the risers 68 are in fluid communication with flexible risers 82 to provide hydrocarbons to the surface vessel.

Figure 4:
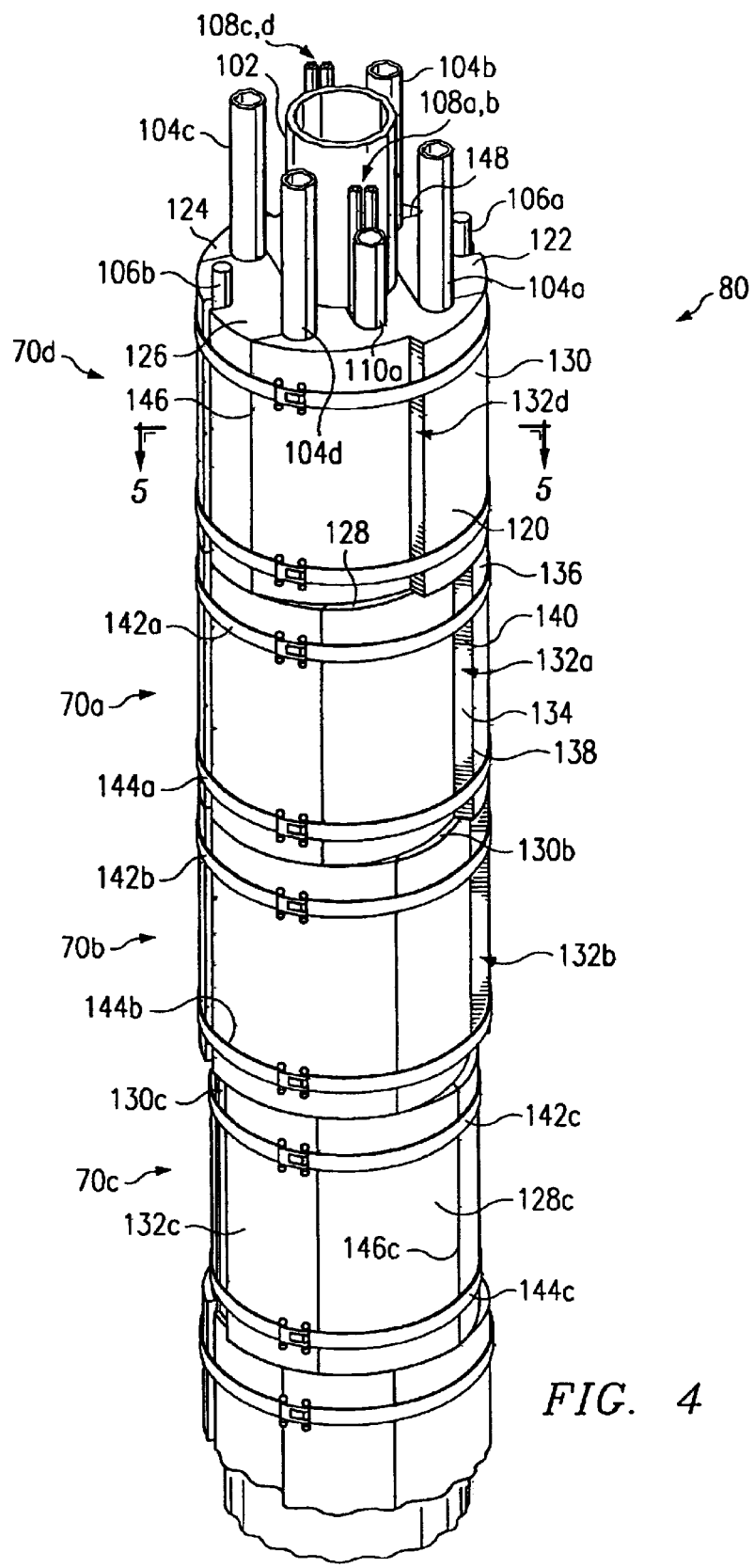
FIG. 4 is a schematic depiction of a representative segment of the upper enhanced buoyancy portion of the substantially cylindrical riser structure of FIG. 3 in which a plurality of risers are held together supported by a central support cylinder in segmented foam quadrants clamped in a substantially cylindrical shape and having segments of applicants' VIV reduction devices applied and clamped to the exterior of the enhanced buoyancy foam riser bundle.

Referring now to FIG. 4, one embodiment of a riser support column with risers encased in a foam retaining material is schematically depicted with a partial perspective view of one portion of a riser support cylinder assembly having foam material in cylindrical quadrants encasing a plurality of risers and further providing additional buoyancy VIV reduction mechanisms clamped around the periphery of the cylindrical support structure. Particularly, a metal cylinder 102 provides the main riser support and a plurality of petroleum recovery risers 104a, 104b, 104c, 104d are provided along with control cables 106a and 106b as well as additional pressurizing pipes 108a, b and 108c and d as well as gas recovery pipes 110a and 110b (110b not shown in FIG. 4). The VIV columnar segments 70a, 70b, 70c, and 70d are shown constructed of four VIV reduction column sections, the risers, conduits and control cables extending along the length of support cylinder being encased within four molded polymeric foam sections 120, 122, 124, and 126 making up each of the columnar segments 70a, 70b, 70c and 70d. Adjacent ones of sections 120, 122, 124 and 126 need not be the same cross-sectional shape, although it is preferred that respectively opposing sections, i.e., 120 and 124, and 122 and 126, be the same shaped as their opposed section. These sections are respectively "split" at junctions 146 and 148 (not shown in FIG. 4, see FIG. 5) for petroleum recovery risers 104a, 104b, 104c and 104d and include half-circle cut-outs for these risers. Sections 122 and 126 include outwardly open cut-outs for cables 106a and 106b, and sections 120 and 124 include inwardly open cut-outs for gas recovery lines 110a and 110b. The construction of these sections will be more fully understood with reference also to FIG. 5 which is across-sectional view of VIV reduction riser assembly according to FIG. 4 taken along section line 5—5.

Each VIV reduction segment 70a, 70b, 70c and 70d has a discontinuity 132a, 132b, 132c and 132d in its outer surface, and a corresponding discontinuity 132a', 132b', 132c' and 132d' on the outer surface of its back side. As depicted in FIG. 4, each of these discontinuities comprises a substantially radially directed face 134 extending inward from the exterior surface 142, a distance approximating between 1/10th and 3/10ths the diameter thereby decreasing the wall thickness of VIV reduction columnar half 130 as depicted at 136. A substantially flat surface 140 is formed projecting substantially at right angles to face 134 thereby providing a right triangular notch 132. Subsequent columnar segments 70a, 70b and 70c also have a similar notches 132a, 132b and 132c, respectively. In the embodiment depicted in FIGS. 4 and 5, two opposed ones of the four columnar segments also has a discontinuity or a notch 132 formed in its face. These sections are clamped using clamps 142 and 144 to securely hold the additional buoyancy foam, into which the VIV reduction mechanism has been formed, onto the exterior of the cylindrical riser assembly 80. At junctions 146 and 148 (not shown in FIG. 4, see FIG. 5) between the sections, the wall thickness of the adjacent VIV reduction column sections is the same.

Figure 5:
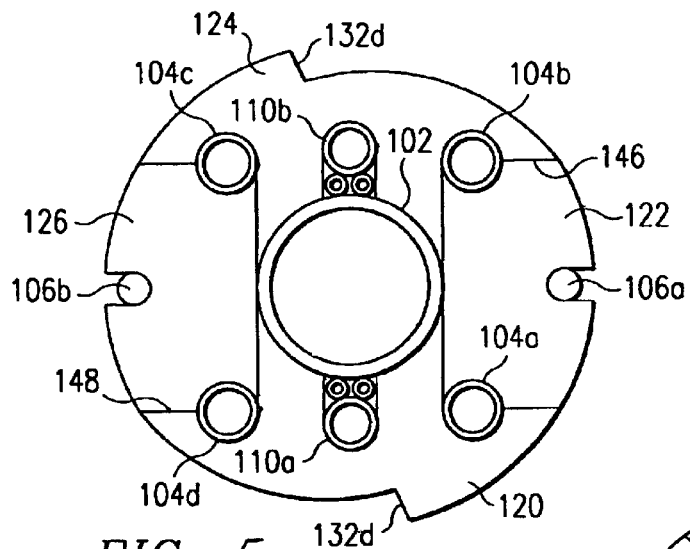
FIG. 5 is a schematic cross-sectional depiction of one embodiment of applicants' inventive VIV reduction device and mechanism in which four sections of the VIV suppression device are depicted for clamping around a riser, two of which in each cylindrical segment have a notch or sharp discontinuity formed therein with each notch at concentric opposed locations, the junctions at each end each section being concentric with the other ends and of the same width so that clamping engagement results in a smooth transition between one half and the other.

Referring to FIG. 5 that is a cross-sectional view of the VIV reduction riser assembly of FIG. 4, it can be seen that the VIV reduction columns according to this embodiment have substantially concentric notches at opposite sections where the thickness of the wall is reduced an equivalent amount D on each side and the wall thickness progressively increases from that notch 132 toward the opposing section, where the diameter continues to increase until the second notch 132 on that opposing section is reached. Again, the discontinuity wall thickness is decreased the distance D and again the wall thickness progressively increases past the junction 148 until the subsequent notch 132 on the other side is reached. Similar structure is provided with respect to each of the VIV reduction columnar segments 70a, 70b, 70c and 70d, in which successive segments are mounted sequentially adjacent to each other except rotated a predetermined angular interval between zero and 90°. It has been found that rotation of approximately 30° provides good VIV reduction, thus discontinuity 132b is offset from the prior discontinuity 132 by an angle of approximately 30°. Subsequent columnar segment 70c is likewise formed with four sections. The foam segments of these successive of these columnar segments are molded such that each successive discontinuity 132 is rotated about 30°. with respect to the next. It has further been found that the length 144 of each columnar segment 170a, b, c, etc. may be desirably about 1.5 times the nominal diameter of the VIV reduction columnar segments.

Figure 6:
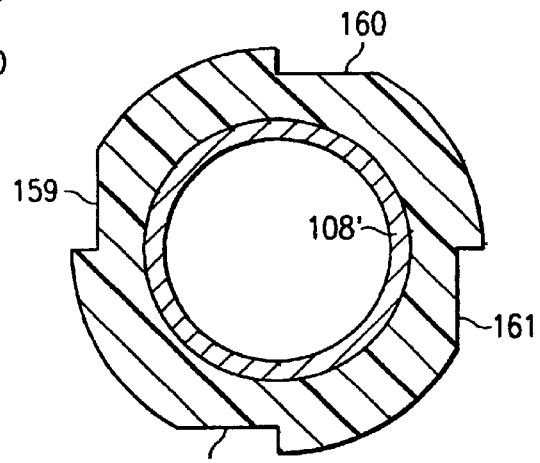
FIG. 6 shows an embodiment of the VIV suppression device in which four discontinuities or four notches or four "step notches" are formed in four quadrants of the VIV columnar segments.

Turning now to FIG. 6, a cross-section another embodiment of the VIV suppression device surrounding a pipe 108' is depicted having four discontinuities or "notches" 158, 159, 160 and 161 formed in four quadrants of the VIV columnar segment. The eccentric exterior shape retains or approximates a substantially cylindrical columnar shape. In this embodiment, the VIV suppression device may conveniently be molded onto the pipe, or slipped onto its end prior to installation of the pipe.

Figure 7:
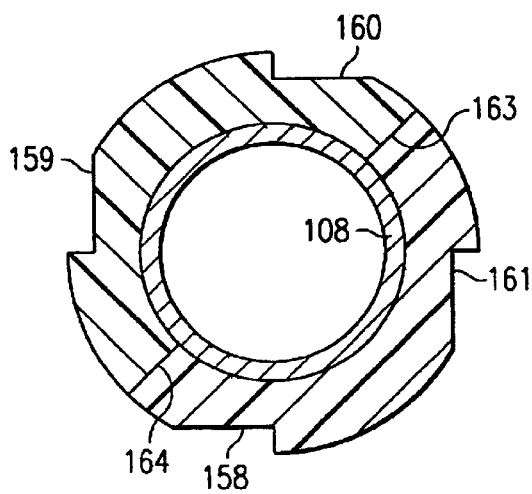
FIG. 7 shows an embodiment similar to FIG. 6, except that each VIV reduction columnar segment is divided into two substantially identical pieces. The cut can be anywhere in the segment.

FIG. 7 shows an embodiment similar to FIG. 6, except that each VIV reduction columnar segment is divided into two substantially identical pieces, to facilitate assembly. The cuts 163 and 164 can be anywhere in the segment.

Figure 8:
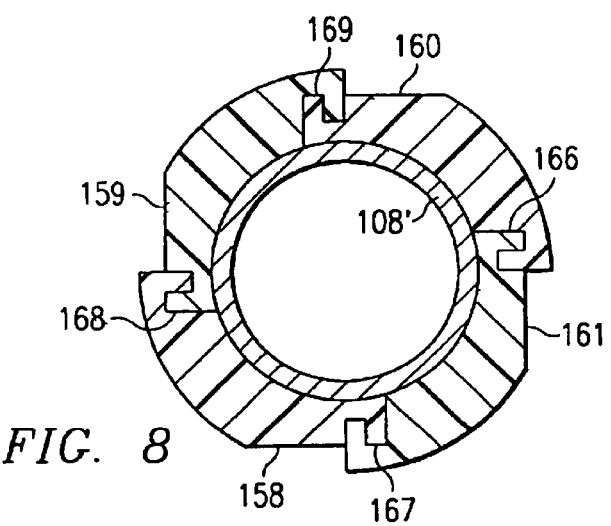
FIG. 8 shows another embodiment similar to FIG. 7, except that each VIV reduction columnar segment is divided into four identical pieces which lock each other together. This embodiment will allow the load on the notches to be better distributed along the entire length of the segment.

FIG. 8 shows another embodiment similar to FIG. 7, except that the discontinuities 158, 159,160 and 161 are, for example, at or near the junctions between each quadrant. In this embodiment, each VIV reduction columnar segment is divided into four identical pieces which lock each other together at zig-zag split lines 166, 167, 168, 169. This embodiment permits the load on the notches to be better distributed along the entire length of the segment.

FIG. 9 is a schematic depiction of a VIV reduction mechanism 180 formed of a plurality of VIV reduction columnar segments 181a, b, c, d, e, f, g, h, i, j, k and l stacked in an elongated column each having a longitudinal discontinuity 182 in the form of notches 182a, b, c, d, e, f, g, h, i, j, k and l. For clarity only one notch on each columnar segment is shown. Each columnar segment is rotated 30° degrees relative to each other. By sequentially rotating the columnar segments 181, the notches 182 are arranged in a pattern that approximates a helical pattern. The rotation angle of 30° provides twelve columnar segments for one complete helical rotation of the vertical notch positions.

FIGS. 10, 11, 12 and 13 are schematic cross-sectional views taken at section lines at 10—10, 11—11, 12—12, and 13—13, respectively. Each cross-sectional depiction represents 90° rotation or each third one of the columnar sections each rotated 30°. In figure 10 an indication of a perspective view is depicted in phantom lines in combination with the solid line cross-sectional view to assist in visualization of the construction of the discontinuity or notch 192a. Although the embodiment depicted shows a cross-section of a substantially cylindrical column segment that is slightly eccentric rather than perfectly cylindrical, the construction may be understood in terms of a nominal diameter D represented by numeral 194. Referring gain to FIG. 9 the height of each column 195 is conveniently in a range of between one half times D to about five times D, to permit offsetting of the discontinuities by the desired rotation angle, however, the ratio is not critical to the invention. Longer columnar segments might be used, for example, where a plurality of notches 192 are formed in each columnar segment rather than the single notch as depicted in FIGS. 9 through 13. The notch or discontinuity has a substantially flat face 193 that provide a corner along the height 195 of the column. The face 193 has a depth B represented by numeral 197 into the eccentric surface of the cylindrical column 191a. Depth B consist of a portion C represented by numeral 198 that accomplishes the eccentricity of the columnar segment and the remainder which corresponds to the reduction in the radius less than the nominal diameter D. The size of the notch depends upon the specific conditions of use. Of course, the rotation need not be 30 degrees, as any offset sufficient to create any pattern of notches effective to diminish VIV will suffice. Again with reference also to FIGS. 10, 11, 12 and 13 each of which depicts a cross-sectional view of the VIV reduction mechanism 190 at Section lines 10—10, 11—11, 12—12 and 13—13, respectively. In the embodiment depicted in FIGS. 9 through 13 as more specifically set forth with reference to FIGS. 10 and 11, the cylindrical columnar segments 192 have a diameter D represented by numeral 194. The longitude and the length of each column is between one-half times D and five times D as represented by reference numeral 195. The discontinuity or notch 192a has a flat face 193 that is radially aligned with the central axis of the VIV columnar segment 191a and has a flat surface 195 projecting at right angles from face 193. This produces a sharp exterior corner at 198 that facilitate initiation of the shear shedding as discussed previously. The depth B represented by numeral 197 may be in the range of 0.1 to 0.3 times the diameter D. The face 195 has a width A represented by numeral 196 that may be in the range of 0.3 to 0.8 times the nominal diameter D.

FIG. 14 depicts a side view of sequentially arranged segments with notches formed at an angle into the outer surface of the VIV reduction device, so that when the segments are successively arranged, the notches form a substantially longitudinally continuous spiral notch. Each columnar segment rotate at 30° relative to the other as with 90 degrees of rotation. The arrangement of each third segment is depicted in cross-sections in FIGS. 15, 16, 17 and 18.

Figure 19:
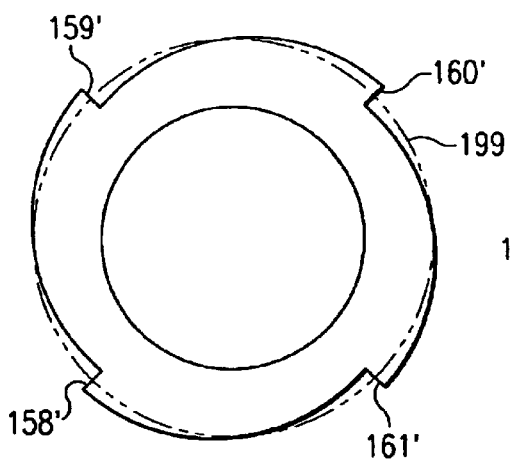
FIG. 19 shows another embodiment in which the outline of the columnar segment is not a circle, with the phantom line in the drawing showing a circle (that is not part of a structure) for comparison. At one side, the surface extends beyond the circular phantom line and at the other side it is inside the circular phantom line. The notch arrangement of successive segments in the longitudinal direction can be the same as depicted in FIGS. 9 and 14.

FIG. 19 shows another embodiment in which the outline of the columnar segment is not exactly a circle; i.e., it is somewhat spiral-shaped. The phantom line 199 in the drawing shows a circle but is not part of a structure. At one side of the surface extends beyond the circular phantom line and at the other side it is inside the circular phantom line. The notch sequential off-setting arrangement in the longitudinal direction can be the same as depicted in FIGS. 9 and 14; i.e., approximately 30 degrees.

Figure 20:
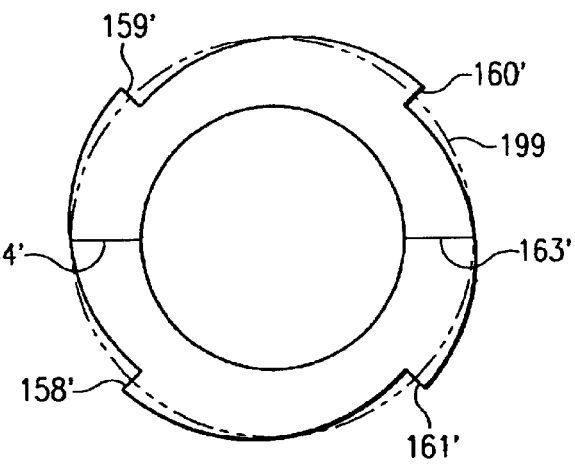
FIG. 20 shows another embodiment similar to FIG. 19, except that the columnar VIV reduction segment is divided into two identical pieces. The notch arrangement of successive segments in the longitudinal direction can be the same as depicted in FIGS. 9 and 14.

FIG. 20 shows another embodiment similar to FIG. 19, except that the columnar VIV reduction segment is divided into two identical pieces at cut lines 163' and 164'. The notch arrangement in the longitudinal direction can be the same as depicted in FIGS. 9 and 14; i.e., approximately 30 degrees.

Figure 21:
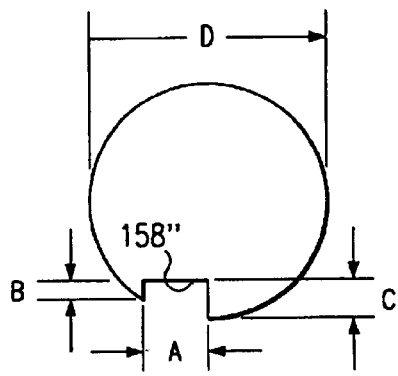
FIG. 21 shows another embodiment of a segment that has a notch of a different shape. The notch arrangement in the longitudinal direction can be the same as depicted in FIGS. 9 and 14.

FIG. 21 shows another embodiment that has a notch 158" of a different shape; i.e., a square. The notch arrangement in the longitudinal direction can be the same as depicted in FIGS. 9 and 14. Although only one notch 158" is depicted, four or any number could be used, as in FIGS. 9 and 14.

Figure 23:
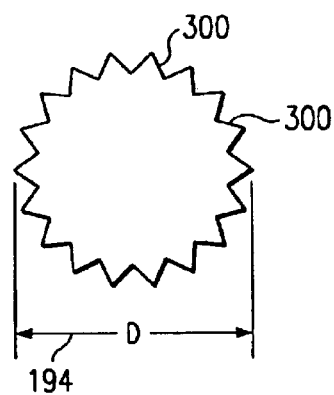
FIG. 23 is a cross-sectional view of one of the segments of FIG. 22, taken along the line 23—23.
Figure 22:
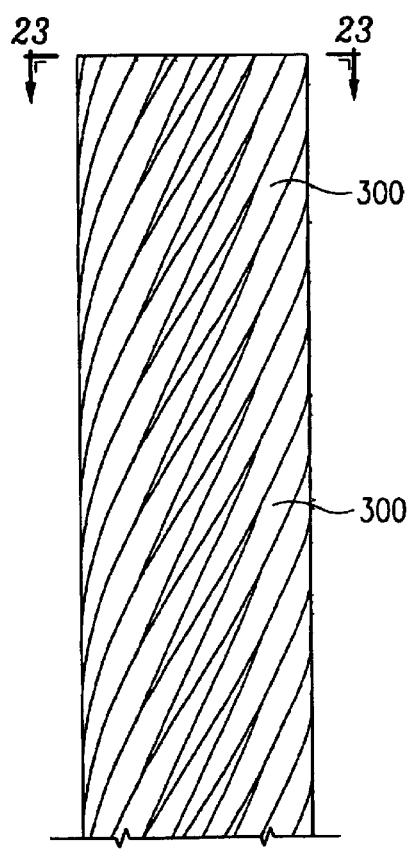
FIG. 22 is a side view of longitudinally arranged segments with triangular notches. The triangular notches cover entire cylindrical surface and in the longitudinal direction, the notches forming spiral (helical) lines.

FIG. 22 is another embodiment which has a cross section as shown in FIG. 23. The triangular notches 300 cover entire cylindrical surface and in the longitudinal direction, the notches form spiral (helical) lines.

This embodiment uses a VIV reduction mechanism in which a plurality of V-type notches 300 are equilateral triangles are formed into the surface of the substantially cylindrical column. Again the star-shaped cross-section of FIG. 23 continuously spirals along the length of the column depicted in FIG. 23. This may be created by a long columnar section longer than the one-half to ten times the diameter columns that might be more appropriate with vertically aligned notches. However for ease of manufacture and for clamping onto cylindrical risers or cylindrical riser support structures or the like columnar sections might still be used and alignment will be easily accomplished because of the uniform star shape provided by the plurality of V-shaped notches.

FIG. 24 and 25 show another embodiment where the cross section 250 is slightly twisted, an ellipse, successive segments being offset about 45 degrees so the long axis of the ellipse "spirals," as shown in FIG. 25, to form a spiral (twisted) shape.

FIGS. 26 and 27 show another embodiment where the cross section 255 is a slightly twisted triangle with rounded corners. Successive segments are offset about 45 degrees, the direction of the triangle, as shown in FIG. 27, to form a spiral (twisted) shape.

FIGS. 28 and 29 show another embodiment where the cross section is a square with rounded corners. The angular orientation of the square rotates, as shown in FIG. 29, to form a spiral (twisted) shape.

FIGS. 30 and 31 show another embodiment where the cross section is an ellipse. The angular orientation of the long axis of the ellipse rotates as shown in FIG. 31, to form a discontinuous stepped pattern.

FIGS. 32 and 33 show another embodiment where the cross section is a triangle with rounded corners. The angular orientation of the triangle rotates, as shown in FIG. 33, to form a discontinuous stepped pattern.

FIGS. 34 and 35 show another embodiment where the cross section is a square with rounded corners. The angular orientation of the square rotates, as shown in FIG. 35, to form a discontinuous stepped pattern.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A vortex-induced vibration (VIV) reduction mechanism for a substantially cylindrical structure for reduction of the effects of vortex-induced vibration (VIV) in the structure when the structure is submerged in flowing fluid, the mechanism comprising:

a plurality of columnar segments disposed around the exterior surface of the structure in a vertically stacked arrangement, each of the segments having a vortex-shedding surface discontinuity provided by a notch formed by a radially inward-directed wall thickness discontinuity of the segment and oriented substantially parallel to the axis of the structure, the segments being arranged with respect to each other so that the surface discontinuity of each segment is circumferentially displaced from the surface discontinuity of an adjacent segment, whereby the surface discontinuities of the plurality of segments define a discontinuous, stepwise, approximately helical pattern of vortex-shedding discontinuities along the length of the structure, wherein each of the columnar segments has at least two vortex-shedding surface discontinuities equidistantly spaced around the exterior surface of the columnar segment, and wherein each columnar segment has a radius that varies continuously in length between each two successive vortex-shedding surface discontinuities.

2. A vortex-induced vibration (VIV) reduction mechanism for a substantially cylindrical structure for reduction of the effects of vortex-induced vibration (VIV) in the structure when the structure is submerged in flowing fluid, tho mechanism comprising:

a plurality of columnar segments disposed around the exterior surface of the structure in a vertically stacked arrangement, each of the segments having at least two vortex-shedding surface discontinuities equidistantly spaced around the exterior surface of the columnar segment and oriented substantially parallel to the axis of the structure, wherein each columnar segment has a radius that varies continuously in length between each two successive surface discontinuities, the segments being arranged with respect to each other so that the surface discontinuities of each segment are circumferentially displaced from the surface discontinuities of an adjacent segment, whereby the surface discontinuities of the plurality of segments define a discontinuous, stepwise, approximately helical pattern of vortex-shedding discontinuities along the length of the structure.

3. The mechanism of claim 2, wherein each of the surface discontinuities is a notch.

4. The mechanism of claim 2, wherein each of the surface discontinuities is a projection.

5. A vortex-induced vibration (VIV) reduction mechanism for a substantially cylindrical structure for reduction of the effects of vortex-induced vibration (VIV) in the structure when the structure is submerged in flowing fluid, the mechanism comprising:

a plurality of columnar segments disposed around the exterior surface of the structure in a vertically stacked arrangement, each of the segments having a vortex-shedding surface discontinuity provided by a notch formed by a radially inward-directed wall thickness discontinuity of the segment and oriented substantially parallel to the axis of the structure, the segments being arranged with respect to each other so that the surface discontinuity of each segment is circumferentially displaced from the surface discontinuity of an adjacent segment, whereby the surface discontinuities of the plurality of segments define a discontinuous, stepwise, approximately helical pattern of vortex-shedding discontinuities along the length of the structure, wherein each columnar segment has a central axis, and wherein the notch in each segment has a first flat surface that is radially aligned with the central axis and a second flat surface that is perpendicular to the first flat surface.

* * * * *